United States Patent [19]

Kolchinsky

[11] Patent Number: 4,725,039
[45] Date of Patent: Feb. 16, 1988

[54] SELF-PRESSURE REGULATING PROPORTIONAL VALVE

[75] Inventor: Abel E. Kolchinsky, Glenview, Ill.

[73] Assignee: Clevite Industries, Inc., Glenview, Ill.

[21] Appl. No.: 26,892

[22] Filed: Mar. 17, 1987

[51] Int. Cl.⁴ .............................................. F16K 31/06
[52] U.S. Cl. .......................... 251/129.08; 251/129.07; 251/129.15; 137/454.2
[58] Field of Search .............. 251/129.08, 282, 129.15, 251/129.07; 137/454.2

[56] References Cited

U.S. PATENT DOCUMENTS

| | | |
|---|---|---|
| 2,861,594 | 11/1958 | Collins . |
| 2,930,404 | 3/1960 | Kowalski . |
| 2,964,286 | 12/1960 | Hoskins . |
| 3,059,892 | 10/1962 | Windsor . |
| 3,076,630 | 2/1963 | Hammond . |
| 3,082,359 | 3/1963 | Mangiafico et al. . |
| 3,245,651 | 4/1966 | Erickson . |
| 3,377,046 | 4/1968 | Frantz et al. . |
| 3,385,320 | 5/1968 | Fahie ................................ 251/282 X |
| 3,988,706 | 10/1976 | Springer . |
| 4,008,876 | 2/1977 | Bastle . |
| 4,021,152 | 5/1977 | Toyoda . |
| 4,387,739 | 6/1983 | Schaming ................... 251/129.15 X |

FOREIGN PATENT DOCUMENTS 372888 12/1963 Switzerland .

Primary Examiner—Arnold Rosenthal
Attorney, Agent, or Firm—Russell E. Baumann

[57] ABSTRACT

A fluid flow control proportional valve having structure for providing mounting therein of any one of a plurality of different solenoid coils having different electrochemical characteristics for providing desired positioning of the movable valve thereof. The solenoid armature is slidably mounted within the solenoid tube by structure providing extremely low friction so as to provide improved accuracy in correspondence between the current flow through the solenoid cell and resulting positioning of the spool assembly of the valve. The structure for mounting the armature in the solenoid tube further defines a seal between the armature and the solenoid tube. Pressure compensation structure is associated with the movable valve member for converting a portion of the instantaneous positive pressure differential acting across the valve between the inlet and outlet ports to urge the valve member to the closed position as a result of an increase in the pressure differential acting across the valve. A bypass tube is further provided for cooperation with the pressure compensation structure.

8 Claims, 3 Drawing Figures

SELF-PRESSURE REGULATING PROPORTIONAL VALVE

TECHNICAL FIELD

This invention relates to variable flow rate proportional control valves and in particular to means for providing self-pressure regulation of such valves.

BACKGROUND ART

In one form of known variable flow rate control valve, the valve body defines a valve chamber having an inlet port and an outlet port communicating therewith. Means are provided for connecting the inlet port to a source of pressurized fluid and a valve member is provided in the valve chamber for selectively controlling the rate of flow of the pressurized fluid from the inlet port to the outlet port.

Means are provided for urging the valve member from a closed position closing the inlet port to an open position, permitting communication between the inlet port and the valve chamber to permit fluid flow through the valve. A common means for positioning the valve comprises an electrical solenoid operator which acts in opposition to spring means which biases the valve member to the closed position. The force produced by the solenoid operator, when energized, and the spring force opposing the solenoid operator are preselectedly coordinated to cause the valve member to be positioned in a preselected open position when the solenoid operator is energized. This provides a preselected amount of opening of the inlet port to provide substantially the desired flow rate of fluid through the valve as a result of the fluid pressure differential thereacross and the amount of the opening of the inlet port.

A problem arises in such valves in that the pressure differential across the valve may change due to a change in the load pressure characteristics. This causes a change in the flow rate which is proportional to the square root of the pressure change.

Thus, while accurate positioning of the valve member may be effected in such valves, this does not assure corresponding accurate maintained fluid flow rate.

DISCLOSURE OF INVENTION

The present invention comprehends the provision of means for overcoming this vexatious problem in a novel and simple manner.

More specifically, the present invention comprehends the provision in such a proportional valve of pressure compensation means associated with the valve member for converting a portion of the instantaneous positive pressure differential acting across the valve between the inlet and outlet ports, urging the valve in a first direction to an instantaneous negative pressure differential acting on the valve member for urging the valve member in a second direction opposite to said first direction. Thus, a change in the pressure differential between the inlet and outlet ports of the valve is caused to provide a proportional counterbalancing change in the negative pressure differential, thereby providing improved maintained fluid flow rate notwithstanding changes in the pressure differential across the valve.

In the illustrated embodiment, the valve comprises a normally closed valve.

More specifically, the invention comprehends the use of venturi means acting between the valve member and the valve body in the valve chamber for converting a portion of the instantaneous positive pressure differential acting across the valve between the inlet and outlet ports urging the valve member toward the closed position to an instantaneous negative pressure differential acting on the valve member for urging the valve member away from the closed position.

The venturi means illustratively comprises a cylindrical surface on the valve body and a confronting frustoconical surface on the valve member widening away from the cylindrical surface in a direction away from the closed position.

The frustoconical surface extends to immediately adjacent the inlet port in the closed position of the valve member of the illustrated embodiment.

For further improved balancing of the valve member, the structure includes means for providing communication between the outlet port and the valve chamber inwardly of the valve member.

In the illustrated embodiment, the operator means comprises a displacement member having a low friction slidable mounting for selectively positioning the valve member.

The variable flow rate control valve of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein.

BEST MODE FOR CARRYING OUT THE INVENTION

Figures 1, 2, 3:
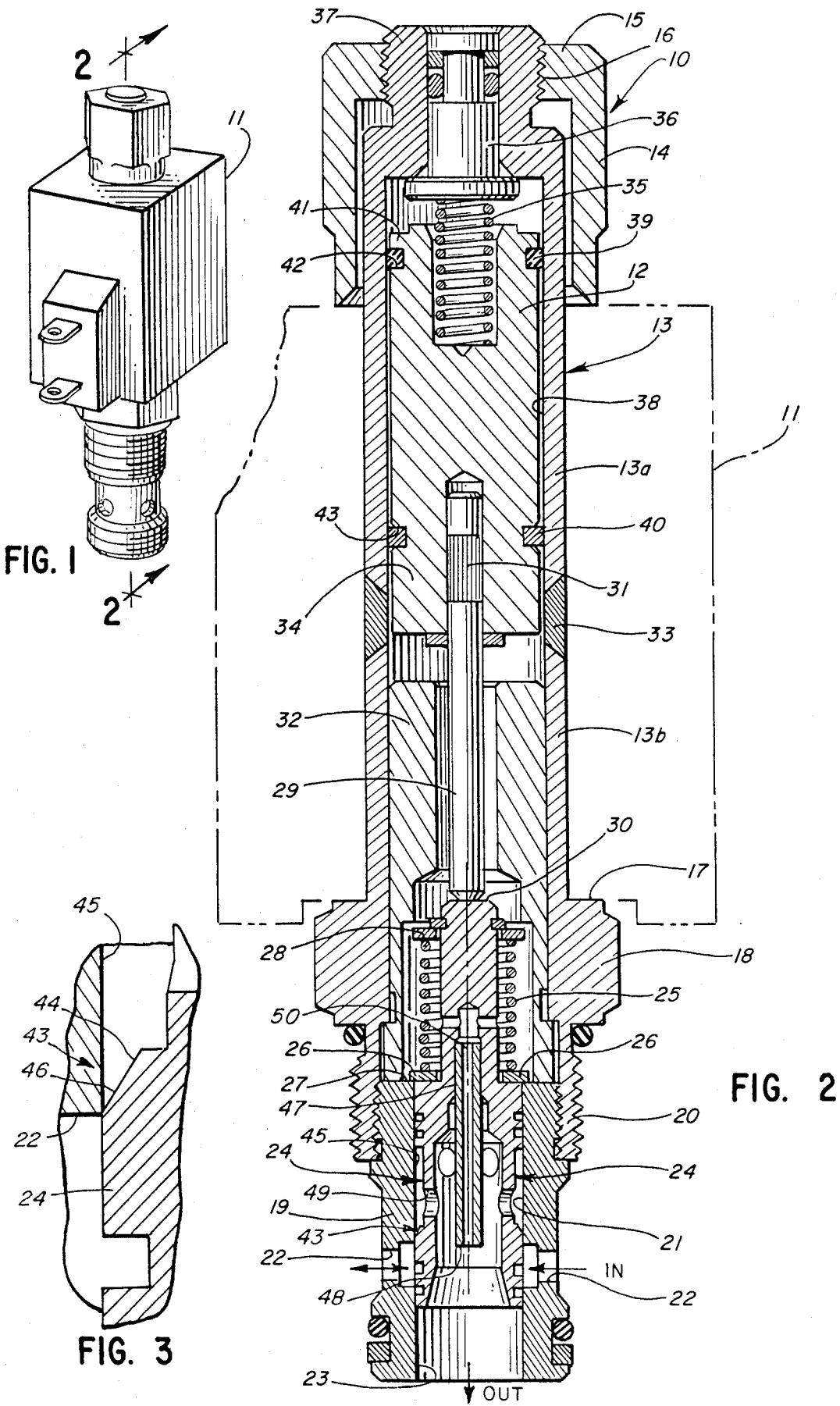
FIG. 1 is a perspective view of a variable flow rate control valve embodying the invention.
FIG. 2 is a fragmentary diametric section thereof.
FIG. 3 is a fragmentary enlarged diametric section illustrating in greater detail the pressure compensation means of the invention.

In the illustrative embodiment of the invention as disclosed in the drawing, a fluid flow proportional valve generally designated 10 is shown to comprise a two-way, normally closed proportional valve provided with an encapsulated solenoid coil 11 which may comprise any one of a plurality of different solenoid coils having different current ratings to provide correspondingly different displacement forces acting on the solenoid plunger, or armature, 12 received within the solenoid tube 13.

Coil 11 is removably mounted in concentrically surrounding relationship to tube 13, as shown in FIG. 2, and is retained in a preselected disposition longitudinally of tube 13 by means of a tubular nut 14 having a distal end 15 threadedly secured to an externally threaded portion 16 defining the distal end of the tube 13. Nut 14 urges the solenoid coil against an annular shoulder 17 defined by an annular collar 18 of the solenoid tube.

As shown in FIG. 2, the solenoid tube includes an outer portion 13a and an inner portion 13b, collar 18 being provided on the inner portion.

A valve sleeve 19 is threadedly secured to the distal end 20 of the tube portion 13b and defines a valve chamber 21 having an inlet portion 22 and an outlet port 23. A valve spool assembly generally designated 24 is slidably mounted in the valve chamber for selectively controlling flow of fluid from inlet 22 to the outlet 23.

Spool assembly 24 is biased to the normally closed position of FIG. 2 by a coil spring 25 acting between an annular stop washer 26 abutting an annular end surface 27 of sleeve 19, and an annular flange 28 on the upper end of the spool assembly 24.

Spool assembly 24 is displaced in opposition to the positioning of spring 25 by a pin 29 engaging an end surface 30 of the spool assembly, and having its distal end 31 fixedly secured to the armature 12. The pin 29 extends coaxially through a tubular stop 32 fixedly retained within the tube portion 13b.

As shown in FIG. 2, the tube portions 13a and 13b of solenoid tube 13 are separated by a nonmagnetic spacer ring 33, the tube portions 13a and 13b being formed of a suitable magnetic material, such as steel.

Armature 12 is coaxially received within tube portion 13a, with a lower distal portion 34 disposed radially inwardly of spacer 33 in the normally closed, de-energized arrangement of the valve shown in FIG. 2. Energization of the solenoid coil 11 produces an electromagnetic force on the armature so as to urge the armature downwardly to bring the lower end portion 34 to within the lower tube portion 13b and concurrently cause pin 29 to urge the spool assembly 24 downwardly to an open position providing communication between inlet ports 22 and outlet port 23. As further shown in FIG. 2, armature 12 is biased downwardly by a coil spring 35 acting between the armature and a plug 36 mounted in the distal end 37 of the solenoid tube portion 13a.

Armature 12 is coaxially movable within the solenoid tube and is slidably supported on the inner surface 38 of the solenoid tube by a pair of slide rings 39 and 40 mounted to the armature at the opposite ends 41 and 34 thereof. As shown in FIG. 3, the slide rings comprise split rings. The rings are mounted in annular, radially outwardly opening recesses 42 and 43 provided in the armature so as to extend radially outwardly therefrom into slidable engagement with the solenoid tube inner surface 38.

Rings 39 and 40 are preferably formed of a low friction material, such as polytetrafluoroethylene, and the inner surface 38 of the solenoid tube is preferably caused to have a low friction characteristic, such as by polishing, so as to effectively minimize frictional forces between the slide rings and the solenoid tube surface.

The finish of the surface 38 is preferably not less than 8 RMS, i.e. substantially a mirror finish, so as to provide the desired low friction support of the armature. As a result of the low friction support, hysteresis as between movement in the opening and closing directions is effectively minimized. Resultingly, improved accuracy in the positioning of the valve 24 may be effected. Similarly, control of the displacement of the armature by selective control of the current passed through the solenoid coil 11 provides accurately corresponding positioning of the armature, and valve 24.

Further, as discussed briefly above, the provision of the nut in threaded association with the distal end of the solenoid tube portion 13a permits ready interchangeability so that any one of a plurality of different solenoid coils having different electromechanical characteristics may be utilized in providing the desired flow control. Thus, it is unnecessary to substitute different springs 25 to provide the desired selective positioning of the spool assembly 24 in the energized condition of the solenoid valve.

The proportional valve of the present invention is extremely simple and economical of construction, while yet providing the highly desirable features discussed above.

A problem arises in such valves in that variations in the pressure differential between the inlet port 22 and the outlet port 23 caused by changes in the characteristics of the load connected to the outlet 23 cause a displacement of the valve member because of the pressure differential across the top and bottom thereof. More specifically, the change in the rate of flow is proportional to the square root of the pressure change.

The present invention comprehends the provision of pressure compensation means generally designated 43 which automatically changes the amount of opening of the valve to compensate for a pressure change and thereby effectively maintaining the desired flow rate.

More specifically, the invention comprehends providing a force on the valve member 24 which is proportional to the square root of the pressure differential but which acts to open the valve more fully as the pressure differential decreases, thereby effectively maintaining the desired flow rate. In the illustrated embodiment, the valve member 24 is provided with a frustoconical surface 44 which widens away from the adjacent cylindrical surface 45 of the valve body adjacent the inlet ports 22.

As seen in FIG. 3, when the valve member 24 moves downwardly from the closed position thereof to uncover the inlet ports 22 as a result of the energization of the solenoid coil 11, fluid flows through the upwardly widening annular space 46 defined between the frustoconical surface 44 and cylindrical surface 45. This rapidly moving fluid produces a venturi effect acting on the frustoconical surface 44 so as to reduce the pressure acting against surface 44 as a result of an increased flow and increasing the pressure as a result of a decreased flow. The decrease in pressure caused by the venturi action provides a force acting upwardly on the valve member, tending to close the valve. Thus, an increase in the pressure differential across the valve causing an increase in the flow rate is offset by an increase in the dynamic pressure differential caused by the venturi effect resulting from the rapid fluid flow past the frustoconical surface 44. The resultant force acting on the valve tends to close the valve and thereby reduce the flow rate, thus providing an automatic self-compensation for pressure changes in the operation of the valve.

As further seen in FIG. 2, a bypass tube generally designated 47 is provided in the valve member 24, which has its lower distal end 48 opening to the outlet 23 at a position subjacent the through passages 49 in the valve member. The upper distal end 50 of the bypass tube opens behind the valve member so as to place this area of the valve chamber at a low pressure similar to the pressure at the lower end 48 in the outlet 23. Thus, the bypass tube also provides for pressure compensation in relieving the pressure behind the valve by providing communication from behind the valve to the low pressure fluid flowing outwardly from the valve.

Thus, the pressure compensation means defined by the venturi 46 cooperates with the pressure compensation means defined by the bypass tube 47 in providing further improved pressure compensation of the valve and thereby further improved maintained accurate flow control.

The foregoing disclosure of specific embodiments is illustrative of the broad inventive concepts comprehended by the invention.

I claim:

1. In a variable flow rate control valve having a valve body defining a valve chamber and having an inlet port and an outlet port communicating with said chamber, means for connecting said inlet port to a source of pressurized fluid, a valve member in said valve chamber, electrical solenoid operator means for urging said valve member in a first direction from a closed position closing said inlet port to an open position permitting communication between said inlet port and said valve chamber to permit fluid flow from said inlet port, through said valve chamber, and outwardly through said outlet port as a result of energization of said solenoid operator means, and spring means acting in an opposite second direction for opposing the solenoid operator means and biasing said valve member to said closed position when the solenoid operator is de-energized, the force produced by said solenoid operator means when energized and the spring force opposing said solenoid operator means being preselectably coordinated to cause said valve member to be positioned in a preselected open position when the solenoid operator means is energized to provide a preselected amount of opening of said inlet port to provide substantially a desired flow rate of fluid through said valve as a result of the fluid pressure differential thereacross and the amount of opening of said inlet port, the improvement comprising
pressure compensation means associated with said valve member for reducing the positive pressure differential acting across the valve between said inlet and outlet ports urging the valve member in said first direction when the valve member is displaced from said closed position, said pressure compensation means applying an instantaneous negative pressure differential acting on said valve member for urging said valve member in said second direction, said pressure compensation means comprising means responsive to a change in the pressure differential between the inlet and outlet ports to cause a proportional counterbalancing change in said negative pressure differential applied to said valve member.

2. The variable flow rate control valve of claim 1 wherein said first direction is the direction of movement of the valve member toward the closed position.

3. The variable flow rate control valve of claim 1 wherein said pressure compensation means comprises venturi means.

4. In a variable flow rate control valve having a valve body defining a valve chamber and having an inlet port and an outlet port communicating with said chamber, means for connecting said inlet port to a source of pressurized fluid, a valve member in said valve chamber, electrical solenoid operator means for urging said valve member in a first direction from a closed position closing said inlet port to an open position permitting communication between said inlet port and said valve chamber to permit fluid flow from said inlet port, through said valve chamber, and outwardly through said outlet port as a result of energization of said solenoid operator means, and spring means acting in an opposite second direction for opposing the solenoid operator means and biasing said valve member to said closed position when the solenoid operator is de-energized, the force produced by said solenoid opoerator means when energized and the spring force opposing said solenoid operator means being preselectedly coordinated to cause said valve member to be positioned in a preselected open position when the solenoid operator means is energized to provide a preselected amount of opening of said inlet port to provide substantially a desired flow rate of fluid through said valve as a result of the fluid pressure differential thereacross and the amount of opening of said inlet port, the improvement comprising
venturi means acting between said valve member and the valve body in said valve chamber for reducing the positive pressure differential acting across the valve between said inlet and outlet ports urging the valve member in said second direction toward said closed position when the valve member is displaced from said closed position, said venturi means applying an instantaneous negative pressure differential acting on said valve member for urging said valve member in said first direction, said venturi means comprising means responsive to a change in the pressure differential between the inlet and outlet ports to cause a proportional counterbalancing change in said negative pressure differential applied to said valve member.

5. The variable flow rate control valve of claim 4 wherein said venturi means comprises a cylindrical surface on said valve body and a confronting frustoconical surface on said valve member widening away from said cylindrical surface in a direction away from said closed position.

6. The variable flow rate control valve of claim 4 wherein said venturi means comprises a cylindrical surface on said valve body and a confronting frustoconical surface on said valve member widening away from said cylindrical surface in a direction away from said closed position, said frustoconical surface extending to immediately adjacent said inlet port in said closed position of the valve member.

7. The variable flow rate control valve of claim 4 further including means for providing communication between said outlet port and said valve chamber inwardly of the valve member.

8. The variable flow rate control valve of claim 4 wherein said operator means comprises a displacement member having a low friction slidable mounting for selectively positioning said valve member.

* * * * *